Patented May 24, 1949

2,471,000

UNITED STATES PATENT OFFICE 2,471,000

ALUMINA GEL PELLETS

Joseph U. Messenger, Dallas, Tex., assignor, by mesne assignments, to Socony-Vacuum Oil Company, Incorporated, New York, N. Y., a corporation of New York No Drawing. Application May 23, 1947, Serial No. 750,171

10 Claims. (Cl. 252—448)

This invention relates to the manufacture of solid catalysts and relates more particularly to the manufacture of alumina catalysts in the form of relatively small spherical or spheroidal particles or pellets.

Alumina catalysts have found extensive use in various types of hydrocarbon conversion processes and in these processes the catalyst may be employed as a fixed bed or as a moving bed. While the catalyst may be employed in various shapes, it has been found that the most desirable shapes are spheres since in fixed bed operations the catalyst will uniformly pack in the reaction zone and thereby minimize the possibility of channeling of the hydrocarbon reactants and products and in moving bed operations the catalyst will be less susceptible to fracture and attrition than irregular or fragmentary shapes. It is also desirable that the spheres be as small as practical operations will permit in order to obtain the benefit of large outside surface areas exposed to the reactants per unit volume of catalyst. Further, in moving bed operations, such as in fluid flow technique, small pellets are essential in order to obtain proper movement of the catalyst under the carrying effect of the gaseous reactant stream.

Spherical and spheroidal alumina particles or pellets have been prepared by extruding a hydrosol of alumina through an orifice into a body of water-immiscible liquid, such as a mineral oil, which overlies a body of aqueous solution containing a material, such as ammonia, capable of setting or converting the alumina sol to a gel. Upon extrusion into the body of water-immiscible liquid, the sol assumes a spherical form due to the surface tension between the sol and the water-immiscible liquid. The sol spheres, being more dense than the water-immiscible liquid, descend through the liquid, pass through the interface, and then descend into the underlying body of aqueous solution where they are set into gel spheres by the action of the setting or gelling material. While this method of forming alumina gel spheres is satisfactory for the formation of relatively large spheres, it has not been successfully employed for the formation of relatively small spheres. Thus when this method is employed for the purpose of forming relatively small spheres, such as spheres, after drying and activating, having diameters not greater than about one millimeter, for example, by extruding the hydrosol under conditions to form small globules into the water-immiscible layer, the globules tend to distort and agglomerate at the interface between the two liquid bodies to form large, irregular masses rather than descend to the lower setting layer in their original form of small, discrete spheres.

It is an object of this invention to provide a process for the production of small, spheroidal particles or pellets of alumina catalyst. It is another object of this invention to provide a process for the production of alumina pellets having a diameter not greater than about one millimeter. It is another object of this invention to provide a method whereby small, spheroidal particles or pellets of alumina catalyst may be obtained by the process wherein alumina hydrosol is extruded into a water-immiscible forming layer overlying an aqueous setting layer. It is another object of this invention to prevent agglomeration of sol globules at the interface between a water-immiscible forming layer and an aqueous setting layer. Other objects of this invention will be apparent from the following description thereof.

In accordance with the invention, small spheroidal particles or pellets of alumina catalyst are produced by forming small globules of alumina hydrosol in a water-immiscible forming layer overlying an aqueous setting layer and maintaining in solution in said aqueous setting layer a material capable of reducing the differential in density between the two layers and reducing the interfacial tension between the two layers.

I have found that two factors are primarily responsible for causing agglomeration of small globules of alumina sol at the interface between a forming layer and a setting layer, namely, the difference in density between the liquids comprising the two layers and the tension of the interfacial boundary between the two layers.

As a result of my investigations, I have determined that the size of the globules formed in the forming layer is a function of the density of the alumina sol, the density of the forming layer, the size of the orifice through which the sol is extruded into the forming layer, and the pressure of the sol behind the orifice. These conditions once being fixed, the size of the globules in the forming layer will also be fixed. I have also determined that the velocity at which the globules descend through the forming layer is a function of the density of the liquid comprising the forming layer and the density and size of the sol globules, as well as other physical factors including the viscosity of the liquid. Thus, these factors being fixed, the rate of descent of the globules through the forming layer will also be fixed. However, when the globules reach the setting layer, which of necessity has a greater density than the forming layer, their rate of descent will be lessened and the extent to which their velocity will be lessened will be a function of the difference in density, or density differential, between the two layers. Thus, when small globules are formed in the forming layer as compared to relatively large globules, their rate of descent will be sufficiently lessened upon reaching the setting layer to permit a build-up or agglomeration with the sol globules which follow in the less dense forming layer at a higher rate.

I have also determined, as a result of my investigations, that density differential is not the only factor rendering impossible the formation of small spheroidal particles of alumina gel by this method of manufacture. This factor, as before mentioned, is the tension of the interfacial boundary between the two liquids. Thus, when small globules of sol reach the interfacial surface, their rate of descent is lowered, or they are even halted, by the tension of the interfacial boundary thereby causing agglomeration or, at the least, distortion of the globules into non-spheroidal shapes.

Materials satisfactory for reducing the density differential and interfacial tension are inert water soluble organic liquids. Included among the organic liquids are the low molecular weight aliphatic alcohols. Of these alcohols, I prefer to employ ethyl alcohol, normal propyl alcohol, or isopropyl alcohol. However, satisfactory results may be obtained with other low molecular weight alcohols such as methyl alcohol, normal butyl alcohol, secondary butyl alcohol, isobutyl alcohol, tertiary butyl alcohol, para-isoamyl alcohol, etc. Other satisfactory inert water soluble organic liquids are the ketones such as acetone.

Ethyl alcohol, normal propyl alcohol, and isopropyl alcohol are economical and readily available, and also are quite soluble in water, permitting adjustment of density differential and interfacial tension over a wide range of values. Certain other alcohols, particularly normal butanol and secondary butanol, are not quite as soluble in water and therefore the extent to which they may be employed per se for adjusting density differential and interfacial tension is more limited. However, it is not necessary that the organic liquids be employed singly, but may be employed in admixture with each other. Accordingly, where normal butyl alcohol, secondary butyl alcohol, or other less soluble alcohol is employed, and sufficient amounts cannot be dissolved because of solubility limitations to achieve a desired reduction in density differential and interfacial tension, a more soluble alcohol, such as methanol, may be employed in admixture with the less soluble alcohol to achieve the desired result.

The amount of organic liquid to be dissolved in the aqueous setting layer will depend upon the extent to which the density differential and interfacial tension are to be reduced. This in turn will depend upon the size of alumina pellet desired, the density of the sol, the density of the liquid employed for the forming layer, and the type and concentration of setting agent employed in the aqueous setting layer. Additionally, the various organic liquids differ in their effect on the interfacial tension and, to a lesser extent, on the density differential. Accordingly, no general rule can be given which will indicate with exactitude the amount of organic liquid to be employed in every case. In each case, however, the amount to be employed can be readily determined by trial.

While the amount of organic liquid to be employed in each case cannot be given with exactitude because of the multiplicity of factors involved, it has been found, however, that in most cases it is possible to obtain pellets having a diameter of one millimeter or less by the process of the invention where the amount of organic liquid employed is sufficient to reduce the density differentiaal to a value which is less than about twice the value given by the expression $$D_S - D_F = 0.140 - 0.0026\gamma$$

where $D_S$ and $D_F$ are the densities in grams per cubic centimeter of the setting and forming layers respectively, and $\gamma$ is the interfacial tension in dynes per centimeter after addition of the organic liquid. Where larger sized pellets are desired, they may be obtained employing a lesser amount of organic liquid and where smaller sized pellets are desired, they may be obtained employing a larger amount of organic liquid.

Any suitable type of liquid or liquids may be employed as the forming layer. Satisfactory liquids are the mineral oils such as normal hexane, naphthas, kerosenes, or light lubricating oils. However, the size of the alumina globules is a function of the viscosity of the forming layer, large globules being formed in high viscosity liquids and smaller globules being formed in low viscosity liquids. Additionally, the size of the globules depends somewhat on the density of the alumina sol. Therefore, selection of a liquid for the forming layer with respect to its viscosity must be made taking into consideration the size of the pellets desired and the density of the sol employed. Generally, the lower viscosity liquids are more desirable.

The aqueous setting layer may contain any suitable type of setting agent. Suitable setting agents comprise basic materials such as ammonia or the various water soluble organic bases such as amines, for example, isoamylamine. Sufficient basic material should be used in the aqueous setting layer to insure setting or gelation of the sol globules by the time they pass through the setting layer. When using ammonia, concentrations beween 1 and 5 per cent by weight have been found satisfactory, concentrations of ammonia higher than 5 per cent may also be used, as, for example, concentrations as high as 15 or 20 per cent or even up to saturation, that is, about 28 per cent. However, it is generally desirable to avoid these higher concentrations for the reason that they tend to set up a distribution coefficient, particularly under the influence of high concentrations of organic liquid for reducing density differential and interfacial tension such that too high a concentration of ammonia will be present in the supernatant forming layer and under these conditions, the sol globules tend to set before they assume spheroidal shape.

Alumina hydrosol for use in the invention may be prepared by any of the methods known to the art. A satisfactory type of hydrosol may be prepared by peptizing amalgamated aluminum metal in an aqueous solution of a weak acid, such as one per cent by weight solution of acetic acid. Amalgamation of the aluminum metal may be accomplished by treating the metal with aqueous mercuric nitrate or other mercury salt, and after amalgamation, washing to remove the mercury salt. The density of the sol affects the strength of the resulting alumina pellet and it is preferred to employ a sol having a density of at least one gram per cubic centimeter.

Following setting of the pellets in the setting layer, they may be removed and dried, as by suction filtration or by warming at temperatures up to about 100° C., or by both filtration and warming. Following drying, the pellets are then activated by heating, as for example, by heating to about 450° C or 500° C. for a period of about four to eight hours. The pellets then may be screened to uniform size, if desired.

After drying and heating, there will be a diminution in the size of the pellets as compared with the size of the globules as originally formed in the forming layer, this diminution depending upon the density of the sol for the most part. Thus, there may be a five fold difference in the size of the globule formed in the forming layer and the pellet obtained after heating and drying. Therefore, as is well understood in the art, to obtain desired pellet sizes this factor must be taken into consideration in selecting the size of the globules to be formed in the forming layer.

The following examples will be illustrative of the invention. In each example, an alumina hydrosol was prepared by peptizing amalgamated aluminum in a one per cent by weight solution of acetic acid in water. The sol was injected in globules about three to four millimeters in diameter into a forming layer overlying an aqueous setting layer containing ammonia and various percentages of organic liquids reducing the density differential and interfacial tension. The set pellets were removed from the setting layer, filtered dry on a suction filter, dried at room temperature for two days and then at 100° C. for one day, and finally activated by heating at 500° C. for four hours. In each example, the activated alumina pellets as finally obtained had diameters of one millimeter or less. Table I gives the conditions for Examples 1 to 6.

Table I

| Example Number | Forming Layer, Component | Setting Layer Component | Weight, Per cent |
|---|---|---|---|
| 1 | Normal Hexane | Isopropyl Alcohol | 21.8 |
| | | Ammonia | 13.1 |
| | | Water | 65.1 |
| 2 | Mineral Oil having 100° F. viscosity of 24.6 Centistokes. | Isopropyl Alcohol | 44.9 |
| | | Ammonia | 5.8 |
| | | Water | 49.3 |
| 3 | Kerosene | Normal Propyl Alcohol | 57.2 |
| | | Ammonia | 11.1 |
| | | Water | 31.7 |
| 4 | do | Normal Butyl Alcohol | 13.3 |
| | | Methyl Alcohol | 4.3 |
| | | Ammonia | 12.9 |
| | | Water | 69.5 |
| 5 | do | Tertiary Butyl Alcohol | 17.3 |
| | | Ammonia | 12.9 |
| | | Water | 69.8 |
| 6 | do | Para-Isoamyl Alcohol | 10.8 |
| | | Methyl Alcohol | 31.6 |
| | | Ammonia | 13.0 |
| | | Water | 44.6 |

Examples 7 to 12 are further illustrative of the invention. The procedures followed were the same as described above in connection with Examples 1 to 6, except that the density of the forming and setting layers and the interfacial tension were measured. The density was measured in grams per cubic centimeters by means of a density balance. The interfacial tension was measured by determining the amount of force required to pull a platinum ring through the interface and substituting in the equation $$\gamma = \frac{wg}{2L}$$

where $w$ is the force in grams necessary to pull the ring through the interface, $g$ is the acceleration of gravity in centimeters per second per second and $L$ is the circumference of the ring in centimeters. Table II gives the conditions of Examples 7 to 12.

Table II

| Example Number | Forming Layer Component | Density | Setting Layer Component | Weight, Per cent | Density | Interfacial Tension |
|---|---|---|---|---|---|---|
| 7 | Kerosene | .810 | Ethyl Alcohol | 64.2 | .860 | 4.26 |
| | | | Ammonia | 9.0 | | |
| | | | Water | 26.8 | | |
| 8 | do | .810 | Ethyl Alcohol | 87.7 | .820 | 3.22 |
| | | | Ammonia | 4.3 | | |
| | | | Water | 8.0 | | |
| 9 | Naphtha | .765 | Isopropyl Alcohol | 21.9 | .913 | 8.35 |
| | | | Ammonia | 13.1 | | |
| | | | Water | 65.0 | | |
| 10 | Kerosene | .812 | Isopropyl Alcohol | 31.3 | .902 | 5.42 |
| | | | Ammonia | 13.5 | | |
| | | | Water | 55.2 | | |
| 11 | do | .814 | Secondary Butyl Alcohol | 12.8 | .926 | 5.46 |
| | | | Methyl Alcohol | 4.0 | | |
| | | | Ammonia | 12.2 | | |
| | | | Water | 71.0 | | |
| 12 | do | .810 | Acetone | 34.0 | .895 | 12.7 |
| | | | Ammonia | 13.4 | | |
| | | | Water | 52.6 | | |

Having thus described my invention, it is to be understood that such description has been given by way of illustration and example only, and not by way of limitation, reference for the latter purpose being had to the appended claims.

I claim:

1. The process of preparing spheroidal particles of alumina gel which comprises forming a hydrosol of alumina, maintaining a body of water-immiscible liquid above a body of an aqueous solution of a base capable of converting said hydrosol to a gel, introducing said hydrosol to said body of water-immiscible liquid in a manner to produce sol globules whereby said globules assume spheroidal shape due to surface tension and pass through the interface into said aqueous solution and are thereby caused to gel to form spheroidal particles of alumina hydrogel and maintaining in said aqueous liquid a substantial amount of an inert water soluble organic liquid capable of reducing the density differential and the interfacial tension between the bodies of water-immiscible liquid and aqueous solution.

2. The process of claim 2 wherein the organic liquid is an aliphatic alcohol.

3. The process of claim 2 wherein the alcohol is ethyl alcohol.

4. The process of claim 2 wherein the alcohol is normal propyl alcohol.

5. The process of claim 2 wherein the alcohol is isopropyl alcohol.

6. The process of preparing spheroidal particles of alumina gel having a diameter not greater than about one millimeter which comprises forming a hydrosol of alumina, maintaining a body of water-immiscible liquid above a body of an aqueous solution of a base capable of converting said hydrosol to a gel, introducing said hydrosol to said body of water-immiscible liquid in a manner to produce sol globules of such size that upon drying their diameter will be not greater than about one millimeter whereby said globules assume spheroidal shape due to surface tension and pass through the interface into said aqueous solution and are thereby caused to gel to form spheroidal particles of alumina hydrogel and maintaining in said aqueous liquid an inert water soluble organic liquid capable of reducing the density differential and the interfacial tension between the bodies of water-immiscible liquid and aqueous solution in amounts such that the difference in densities of the two bodies is less than about twice the value given by the expression $$0.140 - 0.0026\gamma$$

where $\gamma$ is the interfacial tension.

7. The process of claim 6 wherein the organic liquid is an aliphatic alcohol.

8. The process of claim 7 wherein the alcohol is ethyl alcohol.

9. The process of claim 7 wherein the alcohol is normal propyl alcohol.

10. The process of claim 7 wherein the alcohol is isopropyl alcohol.

JOSEPH U. MESSENGER.

REFERENCES CITED

The following references are of record in the file of this patent:

UNITED STATES PATENTS

| Number | Name | Date |
|---|---|---|
| 2,384,946 | Marisic | Sept. 18, 1945 |
| 2,422,499 | Pierce et al. | June 17, 1947 |
| 2,429,751 | Gohr et al. | Oct. 28, 1947 |

OTHER REFERENCES

Glasstone Text Book of Phys. Chem., Van Nostrand, 1940, page 488. Copy in Scientific Library.

---

Certificate of Correction

Patent No. 2,471,000.                                                                                           May 24, 1949.

JOSEPH U. MESSENGER

It is hereby certified that errors appear in the printed specification of the above numbered patent requiring correction as follows:

Column 4, line 29, for "entiaal" read *ential*; column 7, line 24, for the claim reference numeral "2" read *1*;

and that the said Letters Patent should be read with these corrections therein that the same may conform to the record of the case in the Patent Office.

Signed and sealed this 8th day of November, A. D. 1949.

[SEAL]

THOMAS F. MURPHY,
*Assistant Commissioner of Patents.*